(12) United States Patent
De Traglia Amancio Filho et al.

(10) Patent No.: US 7,575,149 B2
(45) Date of Patent: Aug. 18, 2009

(54) METHOD OF CONNECTING A METALLIC BOLT TO A PLASTIC WORKPIECE

(75) Inventors: Sergio De Traglia Amancio Filho, Hamburg (DE); Matthias Beyer, Reppenstedt (DE); Jorge F. Dos Santos, Avendorf (DE)

(73) Assignee: GKSS-Forschungszentrum Geesthacht GmbH, Geesthacht (DE)

( * ) Notice: Subject to any disclaimer, the term of this patent is extended or adjusted under 35 U.S.C. 154(b) by 228 days.

(21) Appl. No.: 11/602,868

(22) Filed: Nov. 20, 2006

(65) Prior Publication Data

US 2007/0130741 A1 Jun. 14, 2007

(30) Foreign Application Priority Data

Nov. 28, 2005 (DE) .................. 10 2005 056 606

(51) Int. Cl.
*B23K 20/02* (2006.01)
*B23K 20/12* (2006.01)

(52) U.S. Cl. .................. 228/135; 228/136; 228/140; 228/164; 29/505; 29/525.05; 29/525.01; 29/525.15; 411/171; 411/500; 411/501; 411/504; 411/505; 156/73.5; 156/92

(58) Field of Classification Search .................. 411/171, 411/500, 501, 504, 505; 156/73.5, 92; 228/135, 228/136, 140, 164; 29/505, 525.05, 525.01, 29/525.15

See application file for complete search history.

(56) References Cited

U.S. PATENT DOCUMENTS

| | | | |
|---|---|---|---|
| 3,184,353 A * | 5/1965 | Balamuth et al. .......... 156/73.1 |
| 3,477,115 A | 11/1969 | Martin et al. | |
| 3,481,803 A | 12/1969 | Hewitt | |
| 3,654,688 A | 4/1972 | Setzler | |
| 3,762,028 A | 10/1973 | Swearingen et al. | |
| 4,242,787 A | 1/1981 | Deribas et al. | |
| RE31,007 E * | 8/1982 | Best ............................. 52/408 |
| 4,987,714 A * | 1/1991 | Lemke ......................... 52/410 |

(Continued)

FOREIGN PATENT DOCUMENTS

DE 3430440 5/1986

(Continued)

OTHER PUBLICATIONS

European Search Report for EP 06 02 4429.

*Primary Examiner*—Jessica L Ward
*Assistant Examiner*—Erin B Saad
(74) *Attorney, Agent, or Firm*—Marshall, Gerstein & Borun LLP

(57) ABSTRACT

A method of connecting a metallic bolt to a plastic work piece is shown and described. The object to provide a method which makes possible a reliable connection between metal workpieces on the one hand and plastic workpieces on the other hand is achieved in that a first plastic work piece and a metallic bolt are provided, and in that the bolt is pressed into a surface of the first plastic workpiece, the bolt being rotated during the pressing-in, and the rotational speed of the bolt being selected in such a way that the first plastic workpiece is plasticized, so that the bolt is anchored in the first plastic workpiece in a positive-locking manner after the rotation is stopped.

12 Claims, 6 Drawing Sheets

A)

B)

C)

D)

U.S. PATENT DOCUMENTS

| | | | |
|---|---|---|---|
| 5,271,785 | A | 12/1993 | Devine |
| 6,227,433 | B1 | 5/2001 | Waldron et al. |
| 2001/0005541 | A1 | 6/2001 | Iida et al. |
| 2003/0135974 | A1 | 7/2003 | Stevenson et al. |
| 2004/0232209 | A1 | 11/2004 | Stol et al. |
| 2005/0126680 | A1 | 6/2005 | Aeschlimann et al. |
| 2006/0213954 | A1 | 9/2006 | Ruther et al. |

FOREIGN PATENT DOCUMENTS

| | | |
|---|---|---|
| DE | 3709480 | 10/1988 |
| DE | 3807976 | 9/1989 |
| DE | 4227452 | 3/1993 |
| DE | 4428938 | 3/1996 |
| DE | 19620814 | 11/1997 |
| DE | 19630271 | 4/1998 |
| DE | 19815217 | 10/1999 |
| DE | 10149633 | 4/2003 |
| DE | 102006013529 | 10/2006 |
| FR | 2883499 | 9/2006 |
| GB | 2364270 | 1/2002 |
| JP | 61083022 | 4/1986 |
| WO | WO-9524291 | 9/1995 |
| WO | WO-9842988 | 10/1998 |
| WO | WO-02062518 | 8/2002 |

* cited by examiner

METHOD OF CONNECTING A METALLIC BOLT TO A PLASTIC WORKPIECE

CROSS-REFERENCE TO RELATED APPLICATION

The present application claims the benefit of priority of German Patent Application No. 10 2005 056 606.5 filed on Nov. 28, 2005. The entire text of the priority application is incorporated herein by reference in its entirety.

The present invention relates to a method of connecting a metallic bolt to a plastic workpiece. In this case, the expression "bolt" refers below to an essentially cylindrical and thus rotationally symmetrical element having a circumferential surface, the diameter in the region of the circumferential surface being considered to be the diameter of the bolt.

In the automobile, shipbuilding and construction industries, "multi-material structures" which comprise plastics on the one hand and metals on the other hand are being increasingly used, the two material constituents being frictionally connected to one another. In this way, the properties of both materials are combined in order thus to obtain a composite material with improved properties. In order to connect the plastics and metals to one another, first of all mechanical connections and adhesive connections may be used.

Suitable mechanical connections are in particular riveted or clinch connections, which, however, have the following disadvantages. Firstly, high stress concentrations occur in the workpieces. Secondly, subsequent slackening of the connection may occur as a result of creep, moisture and relaxation. Finally, a disadvantage with mechanical connections is the fact that their external appearance rules out use in the visible region, or it is necessary to subsequently process this connection.

Adhesive connections have the disadvantage that the strength of the connection can only be assessed with difficulty. Furthermore, the problem arises that the cycle times for producing an adhesive connection are comparatively long due to the curing time of an adhesive. In addition, solvents may be released during the curing, so that monitoring of emissions may become necessary when producing the adhesive connection. In addition, if increased temperatures are necessary for the curing, the workpieces may be affected. Finally, for a reliable adhesive connection, it may be necessary to pretreat the surfaces to be connected, which means an additional outlay.

In addition to the mechanical connections and adhesive connections, welded connections are also known in order to produce multi-material structures. The welding techniques applied for this purpose comprise ultrasonic welding, resistance welding, vibration welding, induction welding and infrared welding. Here, however, the following main disadvantages become evident. Firstly a surface pretreatment is necessary here, too, and secondly, on account of the comparatively low efficiency, the energy consumption for producing Such a welded connection is relatively high. In addition, the welded connections produced in this way have only low reliability, so that they cannot be used in sensitive regions.

In the mean time, "hybrid joining techniques" have been developed in which it is attempted to improve the connection properties by the combination of two or more conventional joining methods. To this end, DE 101 49 633 A1 discloses metal-collar joining, a hole first of all being punched in the metal part, so that the hole is subsequently surrounded by a circular metal "collar". This collar is then pressed into the plastic part to be connected to the metal part, so that there is then a positive-locking connection. During this pressing-in, however, hairline cracks may occur in the plastic part, and these hairline cracks in turn may lead to the failure of the connection under load.

In another hybrid method, a metal and a plastic are connected to one another in such a way that the plastic is injected into cavities which have been formed in the metal parts beforehand, so that a positive-locking connection is produced between plastic on the one hand and metal on the other hand. Due to the complicated preliminary processing of the metal parts, however, such a method is very time-consuming and requires long cycle times.

Based on the prior art, the object of the present invention is therefore to provide a method which makes possible a reliable connection between metal workpieces on the one hand and plastic workpieces on the other hand and which can be carried out in a simple manner.

This object is achieved by a method of connecting a metallic bolt to a plastic workpiece, comprising the following steps:

providing a first plastic workpiece and a metallic bolt, and
pressing the bolt into a surface of the first plastic workpiece, the bolt being rotated during the pressing-in, and the rotational speed of the bolt being selected in such a way that the first plastic workpiece is plasticized, so that the bolt is anchored in the first plastic workpiece in a positive-locking manner after the rotation is stopped.

By means of the method according to the invention, plastic workpieces on the one hand and metallic workpieces on the other hand can be connected to one another via the metallic bolt. In this case, use is made of the fact that, due to the rotation of the bolt during the pressing-in, first of all a thin region, surrounding the bolt, of the plastic workpiece is plasticized, thereby enabling the bolt to be pressed into the plastic workpiece. When the rotation is stopped, the material of the plastic workpiece cures, and positive locking can occur between the bolt and the workpiece, in particular in the axial direction of the bolt. This connection between bolt and plastic workpiece can be produced without it being necessary to pretreat the plastic workpiece. Furthermore, no complicated setups of apparatus are required for carrying out the method according to the invention. In order to ensure a reliable connection, it is merely necessary that parameters which are easy to control be maintained, namely the pressure applied to the bolt and its rotational speed.

If the material of the bolt has a high melting temperature, as is the case with steel for example, the bolt, in a preferred embodiment of the method, may have profiling on its circumferential surface, which profiling may be designed as a helically encircling rib or may comprise a multiplicity of rings. This profiling leads to the requisite positive locking in the axial direction after the rotation of the bolt is stopped and after the subsequent curing of the plasticized material of the plastic workpiece.

In addition to or as an alternative to profiling of the bolt, it is also possible for the bolt to be plasticized and deformed, it being possible in particular for the point of the bolt to be deformed in such a way that it is arched, so that the diameter of the point is greater than that of that section of the bolt which is pressed into the first plastic workpiece. Such a preferred embodiment of the method is advantageous in the case of a bolt material having a lower melting point, such as in the case of aluminum for example. The deformation takes place by virtue of the fact that the heat generated in the bolt by friction and pressure is increased with increasing penetration depth, so that plasticizing then occurs. After the rotation is stopped, the arching of the point provides for the requisite positive locking between bolt and plastic workpiece, a high loading capacity of the connection being ensured in particular in the axial direction of the bolt.

If, in a further preferred manner, two plastic workpieces are to be connected to a metal workpiece by means of the bolt, the second plastic workpiece can be arranged on the first plastic workpiece before the bolt is pressed in, and the bolt can then be pressed in a rotational manner into the first and the second plastic workpiece.

In a further preferred embodiment of the method, a first metal workpiece is placed on the first plastic workpiece against a surface which is opposite the surface into which the bolt is pressed. The bolt is then pressed into the first plastic workpiece to such a depth that the plasticized point of the bolt comes into contact with the first metal workpiece, a welded connection furthermore preferably being formed between the bolt and the first metal workpiece. This ensures that the first metal workpiece bearing against the first plastic workpiece has a surface unaffected by the connection.

According to a further preferred embodiment of the method, a sandwich element of plastic and metal can be produced in such a way that a second metal workpiece which has a through-hole for the bolt is arranged on the first plastic workpiece. The bolt is then passed through the hole and pressed in a rotational manner into the first plastic workpiece. In this case, in a further preferred manner, a further metal workpiece may be located on that side of the first plastic workpiece which faces away from the second metal workpiece, a welded connection being formed between this further metal workpiece and the bolt if the bolt has been pressed far enough into the plastic workpiece.

In order to fix the second metal workpiece to the first plastic workpiece, the bolt preferably has a head with an enlarged diameter. Additionally, caused by the rotation of the bolt, a friction-welded connection can be formed between the head of the bolt on the one hand and the second metal workpiece on the other hand.

The present invention is explained below with reference to a drawing showing only preferred exemplary embodiments. In the drawing.

Figure 1:
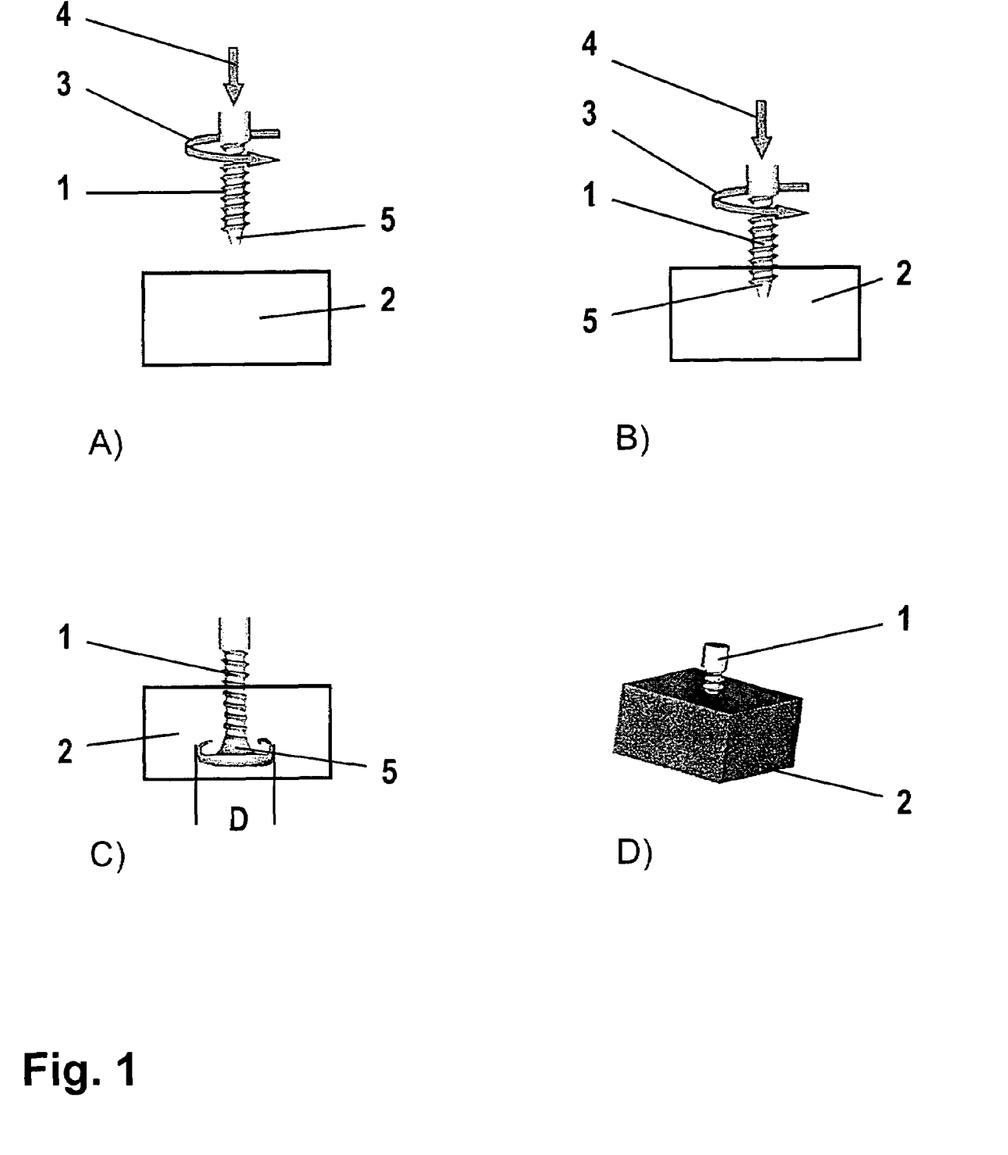
FIG. 1 shows the steps of a first embodiment of the method according to the invention.

Shown in FIG. 1 are the steps for connecting a metallic bolt 1 to a plastic workpiece 2 in a positive-locking manner. A metal workpiece (not shown in FIG. 1) can subsequently be connected to the first plastic workpiece 2 by means of the metal bolt 1.

To connect the bolt 1 to the first plastic workpiece 2, the bolt 1, in this embodiment of the method according to the invention, is set in rotation, as indicated by the arrow 3 (step A). Furthermore, the bolt 1 is lowered in the direction of arrow 4 onto the first plastic workpiece 2 and is pressed into the latter (see step B). As a result of the rotation of the bolt 1, a thin region of the plastic workpiece 2 around the bolt 1 is plasticized. If the bolt 1 is pressed further into the first plastic workpiece 2 (step C), the temperature arising in the bolt 1 due to friction and pressure will become so high that the bolt 1 and in particular its point 5 are plasticized, since the heat energy supplied by friction is greater than the heat flowing off via the bolt 1. As a result of the plasticizing, the point 5 of the bolt 1 in this preferred embodiment of the method is arched in such a way that the diameter D of the point 5 is greater than the diameter of that remaining section of the bolt 1 which is pressed into the plastic workpiece 2.

When the rotation of the bolt 1 is stopped, the plasticized material of the first plastic workpiece 2 around the bolt 1 cures and the arched point 5 remains in this form, so that a positive-locking connection between the plastic workpiece 2 and the bolt 1 has been formed (see steps C and D). The bolt 1 is thus firmly anchored in the first plastic workpiece 2.

In this exemplary embodiment of the method, it is also not only possible for a first plastic workpiece 2 to be connected to the bolt 1, but rather a second plastic workpiece-(not shown) can be arranged on that surface of the first plastic workpiece 2 which faces the bolt 1. The bolt 1 can then be pressed in a rotational manner into the workpieces, so that the bolt 1 is then connected to both plastic workpieces.

In this first preferred embodiment of the method, the positive locking between the bolt 1 and the plastic workpiece 2 is achieved by the deformation of the point 5 of the bolt 1. However, it is also possible for the bolt 1 to have a sufficiently high melting temperature, so that it is not deformed, and the positive locking, after the curing of the plastic workpiece 2, is achieved solely by a profiling on the circumferential surface of the bolt 1.

Providing the equipment for carrying out the method according to the invention is simplicity itself. Conventional friction-welding or industrial drilling machines may be used for carrying out the method, and the mounting of the workpieces can correspond to that for friction welding or for milling. In addition, the connection between the bolt 1 and the plastic workpiece 2 has high mechanical strength, since a low stress concentration in the plastic may be assumed. Due to the increased diameter D of the point 5 of the bolt 1 and the positive-locking connection associated therewith, the latter has a high loading capacity especially in the axial direction of the bolt 1.

Figure 2:
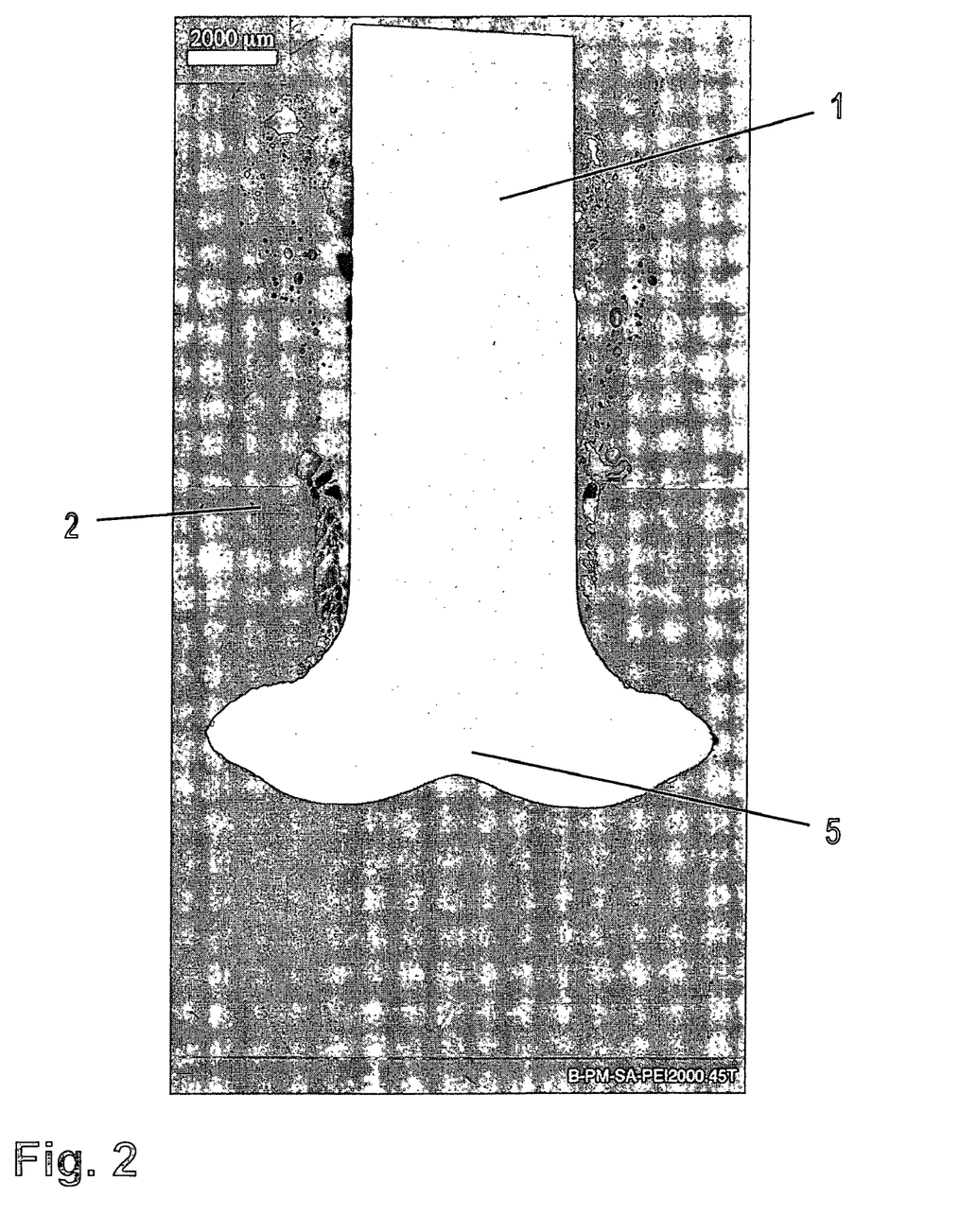
FIG. 2 shows a cross section through a test specimen in which a connection has been produced by means of the first embodiment of the method according to the invention.

Shown in FIG. 2 is a cross section through a test specimen in which a connection has been produced by the first embodiment of the method according to the invention. In this case, a bolt 1 made of aluminum (AA2024-T351) has been pressed in a rotational manner into a plastic workpiece 2 made of polyether imide (PEI), as has already been described in connection with FIG. 1. The rotational speed of the bolt 1 in this case was between 15000 and 23000 rev/min, and the pressure with which the bolt 1 was pressed against the plastic workpiece 2 was between 2 and 10 bar, so that the joining time for the connection was between 0.3 and 3 seconds. The deformation of the point 5 of the bolt 1 as a result of the plasticizing can clearly be seen from the cross section. A test for measuring the tensile strength of the connection in the axial direction of the bolt 1 showed that the bolt 1 tears at a tensile force of 9.54 kN, so that the connection itself withstands markedly higher loads.

Figure 3:
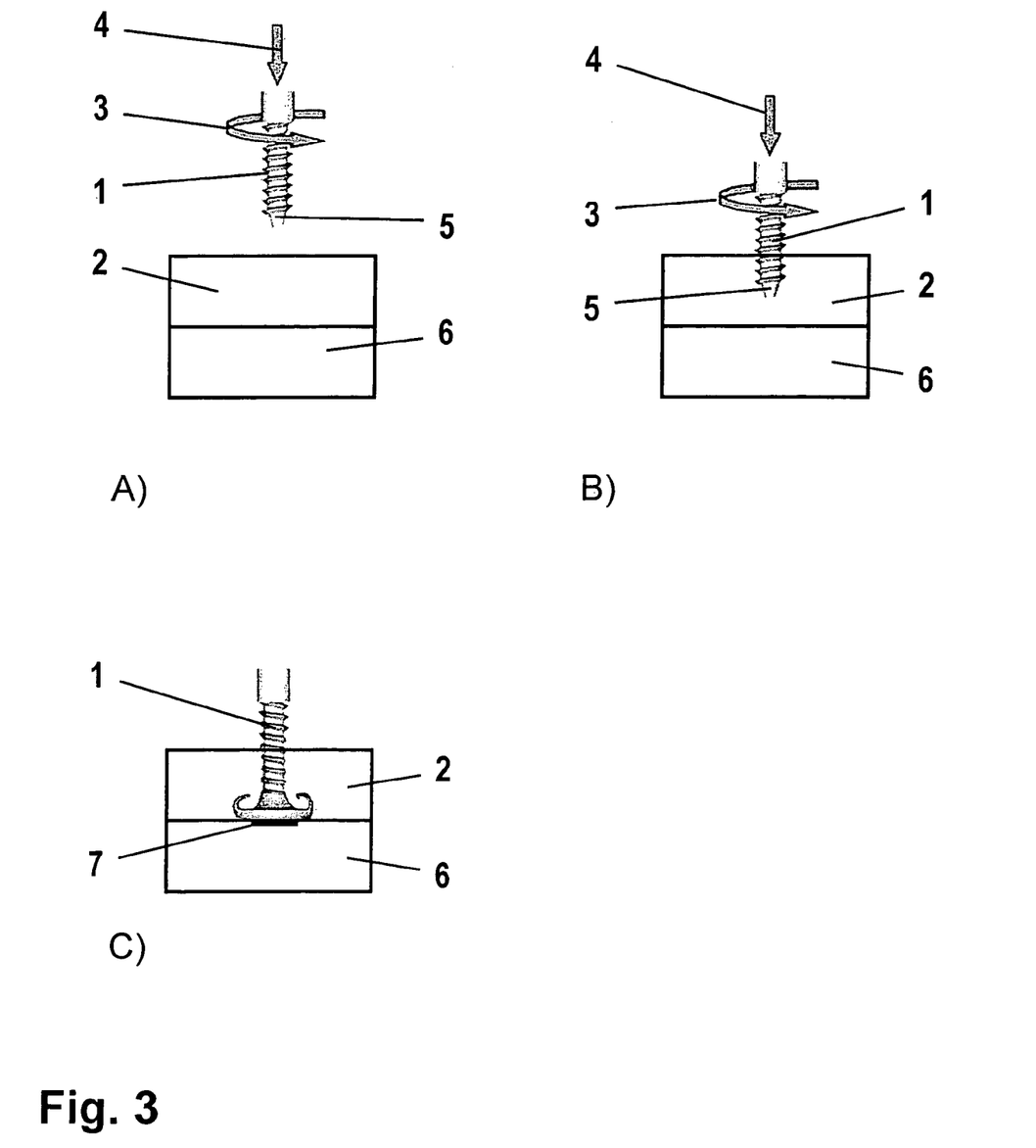
FIG. 3 shows the steps of a second embodiment of the method according to the invention for connecting a plastic workpiece to a first metal workpiece.

Shown in FIG. 3 is a second embodiment of the method according to the invention, in which a first plastic workpiece 2 is connected to a first metal workpiece 6 by means of a bolt 1, the first metal workpiece 6 bearing against a surface of the first plastic workpiece 2 which is opposite the surface into which the bolt 1 is pressed (step A).

As already described in connection with FIG. 1, the bolt 1 is pressed in a rotational manner into the first plastic workpiece 2, to be precise to such a depth that the point 5 of the bolt 1 comes into contact with the surface of the first metal workpiece 6. As a result of the friction between the point 5 of the bolt 1 and the first metal workpiece 6, the point 5 is plasticized and becomes arched. At the same time, that region of the first metal workpiece 6 which lies close to the first plastic workpiece 2 is also plasticized, so that a friction-welded connection 7 occurs between the workpieces 2, 6 after the rotation of the bolt 1 is stopped (see step C).

Figure 4:
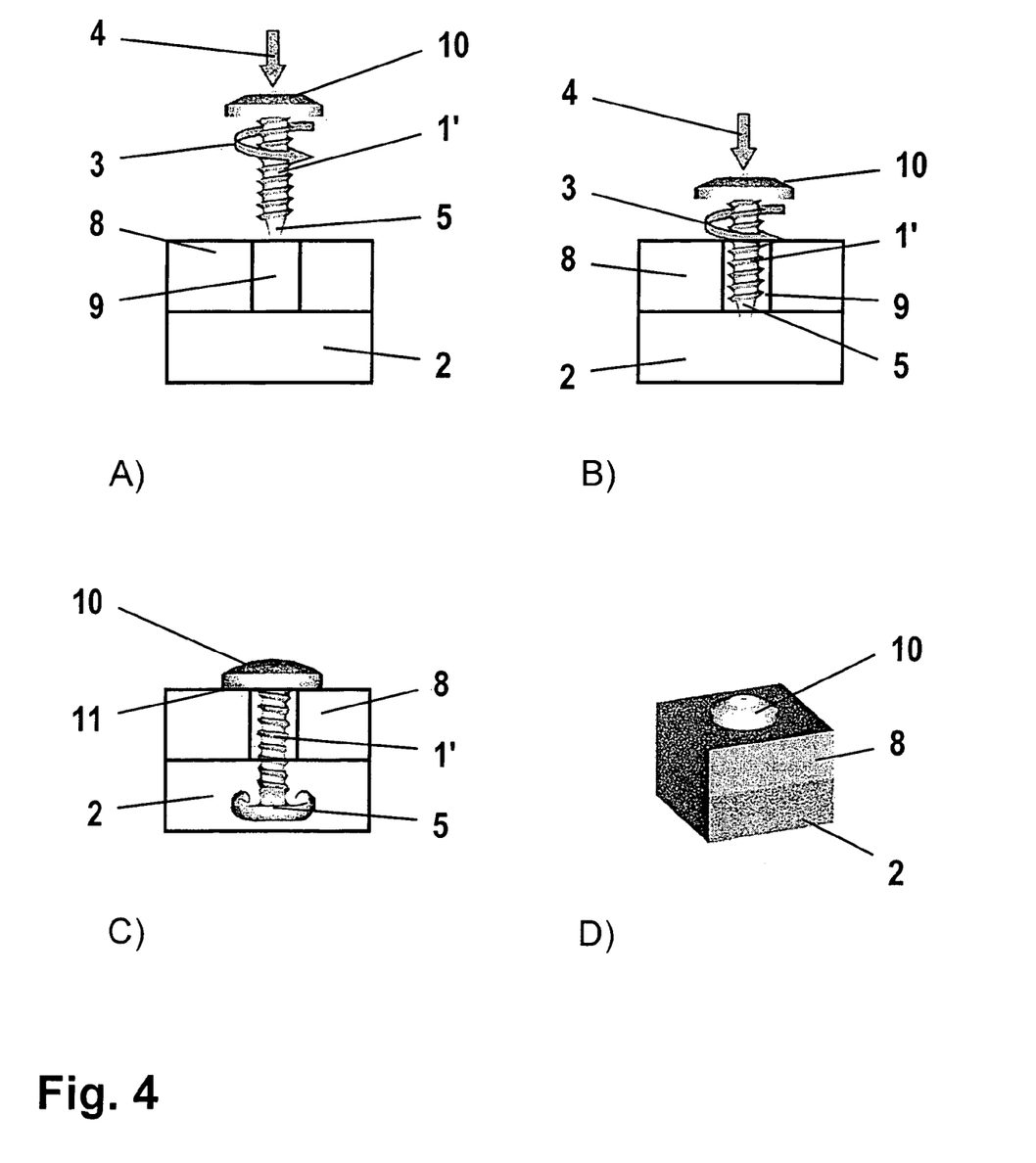
FIG. 4 shows a third embodiment of the method according to the invention for connecting a metal workpiece to a plastic workpiece.

FIG. 4 shows a further alternative embodiment of the method according to the invention in order to connect a first plastic workpiece 2 to a metal workpiece 8. To this end, a second metal workpiece 8 which has a through-hole 9 for the bolt 1' is arranged on the surface of the first plastic workpiece 2. The diameter of the through-hole 9 is in this case greater than the outside diameter of the bolt 1'. In addition, the bolt 1' is provided with a head 10, which has an enlarged diameter compared with the rest of the bolt 1'. In particular, the diameter of the head 10 is greater than that of the through-hole 9.

The bolt 1' is inserted into the through-hole 9 and is then pressed, while being rotated, into the first plastic workpiece 2, as has already been described in connection with the first embodiment. Due to the friction between bolt 1' and plastic workpiece 2, deformation of the point 5 occurs, so that a positive-locking connection is formed between the first plastic workpiece 2 and the bolt 1'. In addition, the friction between the head 10 of the bolt 1' and the second metal workpiece 8 at its surface leads to a friction-welded connection 11 between these elements. This results in an especially robust connection between the first plastic workpiece 2 and the second metal workpiece 8.

Figure 5:
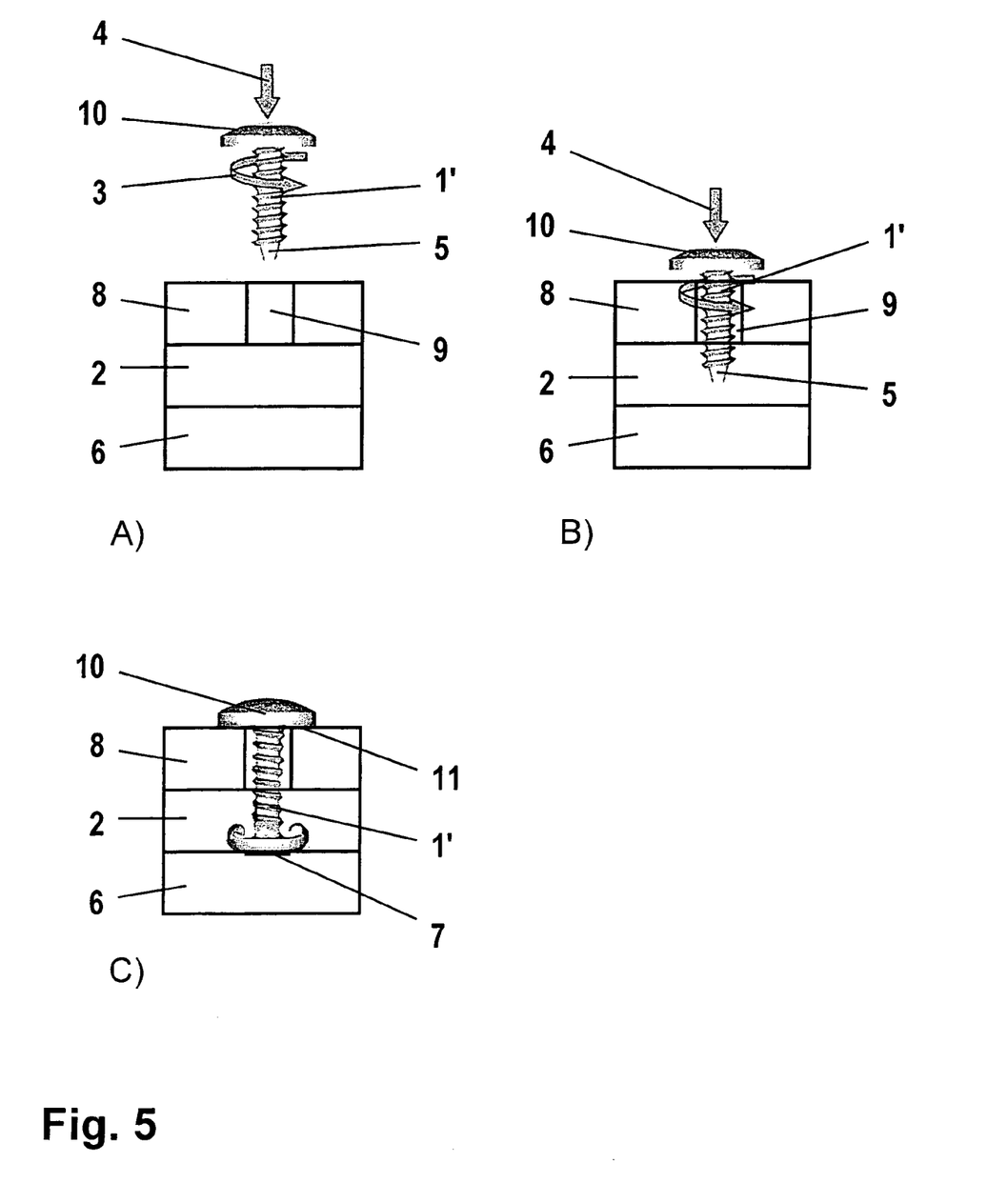
FIG. 5 shows a fourth embodiment of the method according to the invention for connecting two metal workpieces to a plastic workpiece.

Finally, FIG. 5 shows a combination of the embodiments of the method according to the invention which are shown in FIGS. 3 and 4, in which method a first plastic workpiece 2 is connected to a first metal workpiece 6 and a second metal workpiece 8. In this case, firstly a positive-locking connection is formed between the bolt 1' and the first plastic workpiece 2 by the deformation of the point 5 of the bolt 1', and secondly welded connections 7, 11 are formed between the point 5 of the bolt 1' and the first metal workpiece 6 and also between the head 10 and the second metal workpiece 8 (see step C).

Figure 6:
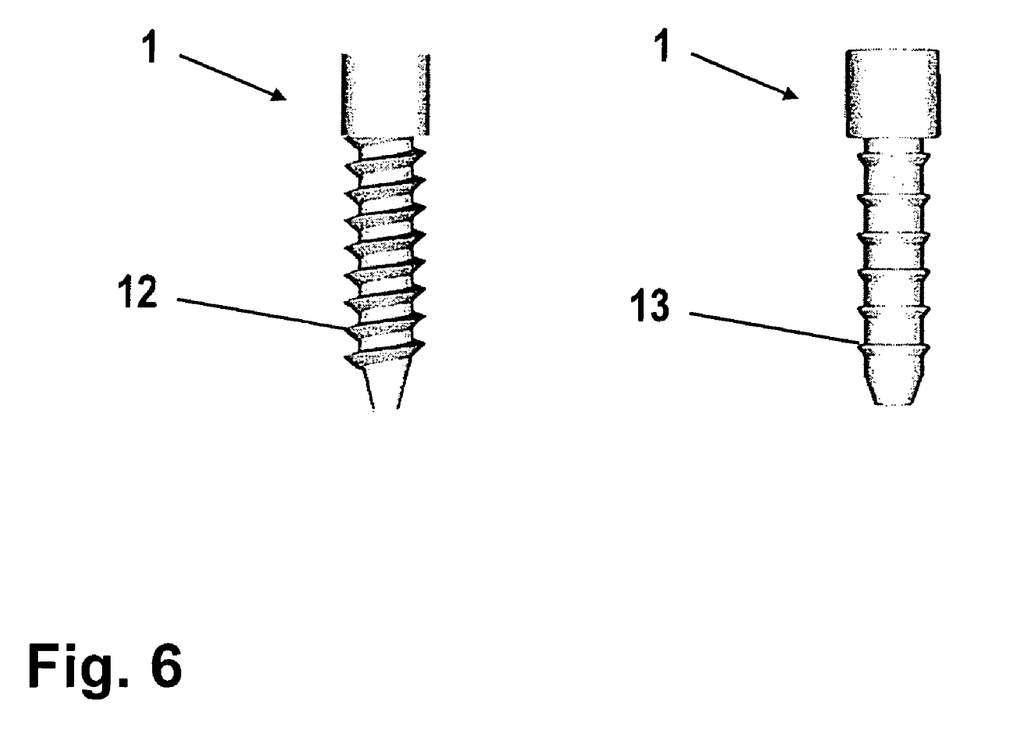
FIG. 6 shows two exemplary embodiments of metal bolts for connecting to plastic workpieces.

The method according to the invention may certainly also be carried out using a bolt which has an even circumferential surface. However, two preferred exemplary embodiments of profiling of the cylindrical bolt 1 are shown in FIG. 6. In the first exemplary embodiment, the bolt 1 has a helically running circumferential rib 12, whereas a multiplicity of rings 13 are provided in the second exemplary embodiment. In both cases, the profiling leads to an increase in the friction between the bolt 1 on the one hand and the plastic workpiece 2 on the other hand, so that a sufficiently large region of the plastic workpiece 2 around the bolt 1 is plasticized. Furthermore, the profiling leads to positive locking being produced between the workpiece 2 and the bolt 1 after the curing of the plasticized region of the plastic workpiece 2.

By means of the method according to the invention, metal workpieces 6, 8 can be connected to plastic workpieces 2 without surface pretreatments being necessary. Furthermore, no complicated and costly devices are necessary, and the cycle times for producing the connection are comparatively short.

What is claimed is:

1. Method of connecting a metallic bolt (1, 1') to a plastic workpiece (2), comprising the following steps:
   providing a first plastic workpiece (2) and a metallic bolt (1, 1'), and
   pressing the metallic bolt (1, 1') into a surface of the first plastic workpiece (2), the bolt (1, 1') being rotated during the pressing-in, and the rotational speed of the bolt (1, 1') being selected in such a way that the first plastic workpiece (2) is plasticized, so that the bolt (1, 1') is anchored in the first plastic workpiece (2) in a positive-locking manner after the rotation is stopped,
   wherein the metal of the metallic bolt (1, 1') is plasticized and deformed at a point (5) thereof,
   wherein the point (5) of the metallic bolt (1,1') is arched in such a way that a diameter (D) of the point (5) is greater than that of that section of the bolt (1, 1') which is pressed into the first plastic workpiece (2).

2. Method according to claim 1, wherein the bolt (1, 1') has profiling (12, 13) on its circumferential surface.

3. Method according to claim 1, wherein a second plastic workpiece is arranged on the first plastic workpiece (2), and the bolt (1, 1') is pressed in a rotational manner into the first and the second plastic workpieces (2).

4. Method according to claim 1, including the step of placing a first metal workpiece (6) on the first plastic workpiece (2) against a surface which is opposite the surface into which the bolt (1, 1') is pressed, and then pressing the bolt (1, 1') in a rotational manner into the first plastic workpiece (2) to such a depth that the point (5) of the bolt (1, 1') comes into contact with the first metal workpiece (6).

5. Method according to claim 4, wherein a welded connection (7) is formed between the bolt (1, 1') and the first metal workpiece (6).

6. Method according to claim 4, including the step of arranging the second metal workpiece (8) having a through-hole (9) for receiving the bolt (1, 1') over the surface of the first plastic workpiece (2) into which the bolt (1, 1') is pressed in a rotational manner, and the bolt (1, 1') is passed through the through-hole (9) and pressed in a rotational manner into the first plastic workpiece (2).

7. Method according to claim 6, wherein the bolt (1, 1') has a head (10) on an end thereof remote from the first plastic workpiece (2), the head (10) having an increased diameter relative to the section pressed into the first plastic workpiece (2).

8. Method according to claim 7, wherein a welded connection (11) is formed between the second metal workpiece (8) and the head (10).

9. Method according to claim 2, wherein the bolt (1,1') is plasticized and deformed.

10. Method according to claim 2, wherein a second plastic workpiece is arranged on the first plastic workpiece (2), and the bolt (1,1') is pressed in a rotational manner into the first and the second plastic workpieces (2).

11. Method according to claim 2, including the step of placing a first metal workpiece (6) on the first plastic workpiece (2) against a surface which is opposite the surface into which the bolt (1, 1') is pressed, and then pressing the bolt (1, 1') in a rotational manner into the first plastic workpiece (2) to such a depth that the point (5) of the bolt (1, 1') comes into contact with the first metal workpiece (6).

12. Method according to claim 5, including the step of arranging the second metal workpiece (8) having a through-hole (9) for receiving the bolt (1, 1') over the surface of the first plastic workpiece (2) into which the bolt (1, 1') is pressed in a rotational manner, and the bolt (1, 1') is passed through the through-hole (9) and pressed in a rotational manner into the first plastic workpiece (2).

* * * * *

UNITED STATES PATENT AND TRADEMARK OFFICE
CERTIFICATE OF CORRECTION

PATENT NO. : 7,575,149 B2
APPLICATION NO. : 11/602868
DATED : August 18, 2009
INVENTOR(S) : Sergio De Traglia Amancio Filho et al.

It is certified that error appears in the above-identified patent and that said Letters Patent is hereby corrected as shown below:

On the Title Page:

Item (75), "Hamburg" should be -- Geesthacht --.

Item (30), "10 2005 056 606" should be -- 10 2005 056 606.5 --.

Signed and Sealed this
Third Day of May, 2011

David J. Kappos
*Director of the United States Patent and Trademark Office*